Figure 1:
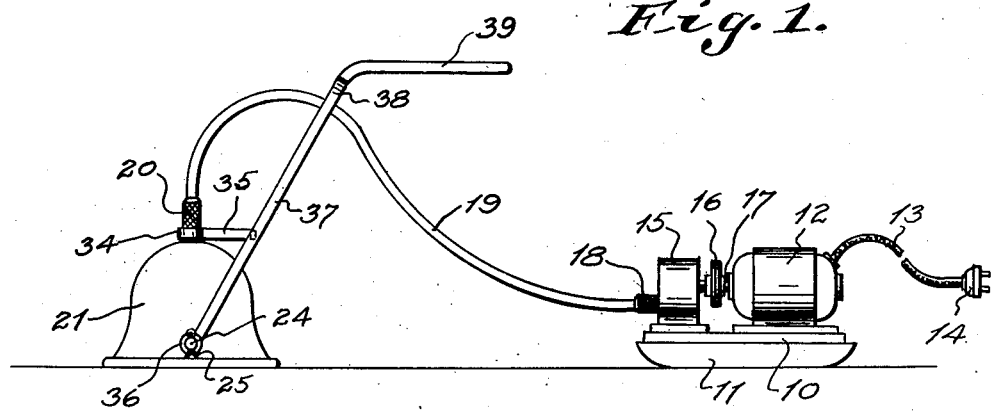

Nov. 6, 1951 R. J. BARROW 2,574,237
HAND GUIDED ROTARY EARTH-WORKING IMPLEMENT
Filed July 26, 1946 2 SHEETS—SHEET 1

Inventor
Russell J. Barrow
By H. Kaye Martin
his Attorney

Nov. 6, 1951 R. J. BARROW 2,574,237
HAND GUIDED ROTARY EARTH-WORKING IMPLEMENT
Filed July 26, 1946 2 SHEETS—SHEET 2
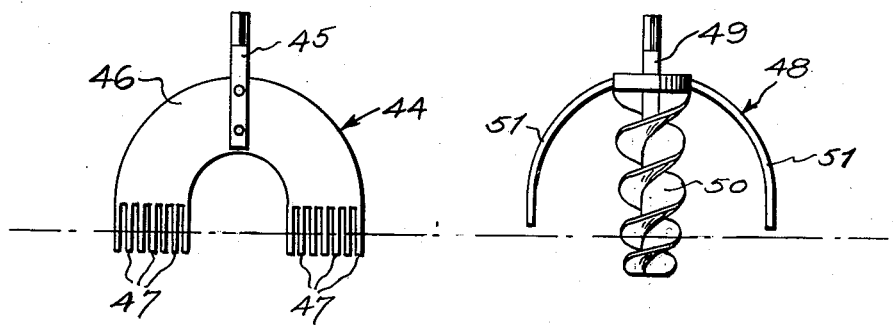
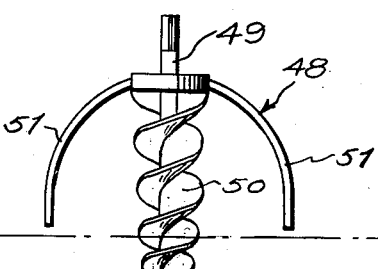
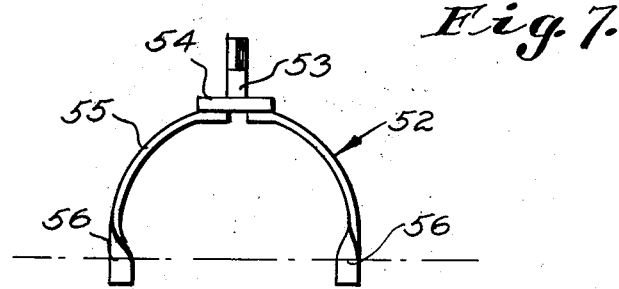
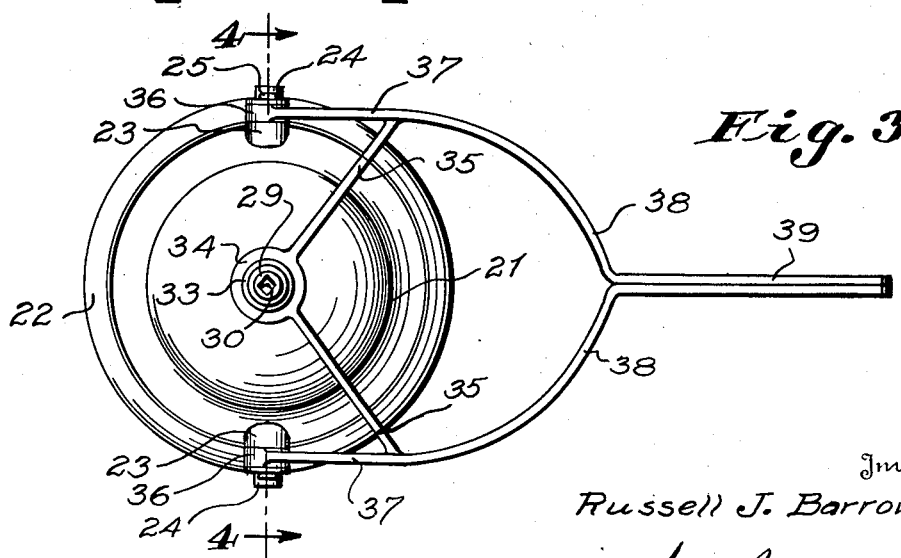
Inventor
Russell J. Barrow
his Attorney Patented Nov. 6, 1951

2,574,237

UNITED STATES PATENT OFFICE 2,574,237

HAND-GUIDED ROTARY EARTH-WORKING IMPLEMENT

Russell J. Barrow, Columbiana, Ohio, assignor of one-half to James R. Barrow, Columbiana, Ohio Application July 26, 1946, Serial No. 686,509

3 Claims. (Cl. 97—43)

This invention relates to an earth working implement, and more particularly to a hand cultivator.

The primary object of the invention is to prepare earth for planting and to agitate and aerate the earth about the roots of growing plants.

Another object is to confine the earth which is agitated to a small area where the planting and cultivating operations are being conducted and to reduce to a minimum the labor involved in the planting and cultivating of crops.

A further object is to save the roots of growing plants from injury during this cultivation.

The above and other objects may be attained by employing this invention, which embodies among its features a rotary agitator adapted to contact and agitate a limited area of soil, drive means for the agitator and a hood enclosing the agitator and the earth being treated.

Other features include a hood adapted to cover a limited area of earth, an agitator mounted in said hood to rotate about a vertical axis, drive means remote from said hood and agitator, a flexible coupling establishing driving connection between the drive means and the agitator, and a handle attached to the hood by which the hood and agitator may be moved from place to place as the cultivation progresses.

Figure 4:
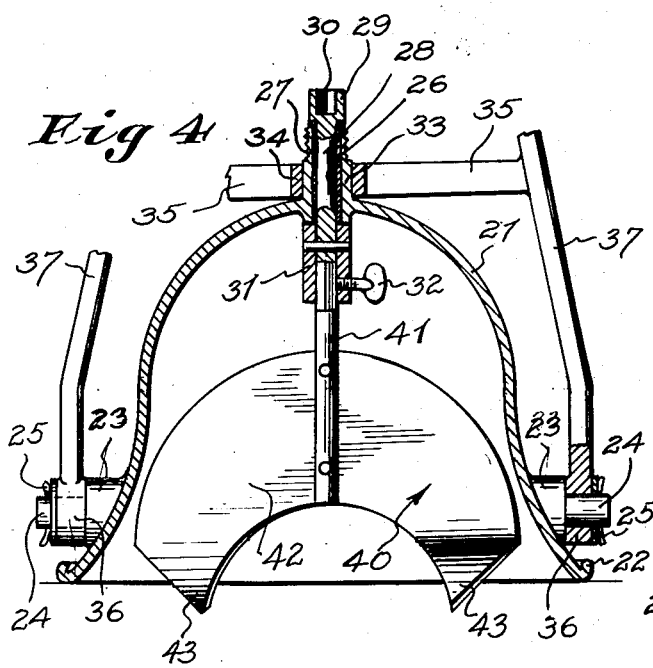
Figure 2:
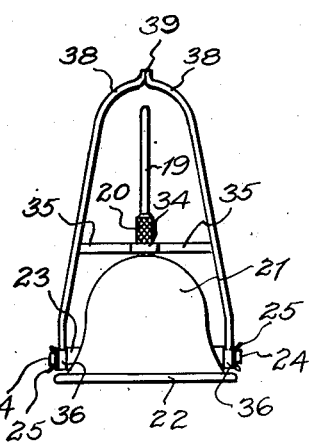

In the drawings:

Figure 1 is a side view of an earth working implement embodying the features of this invention, Figure 2 is an end view of Figure 1, Figure 3 is a top plan view on an enlarged scale of the hood and handle, Figure 4 is a vertical sectional view taken substantially on the line 4—4 of Figure 3, Figure 5 is a view of a rake type cultivator blade for use with the device, Figure 6 is a side view of an auger type blade for use in planting; and Figure 7 is a view illustrating a modified form of cultivator blade.

Referring to the drawings in detail, my improved cultivator comprises a platform 10 which may be supported on skids 11 or if desired on wheels (not shown). Mounted on the platform 10 is a prime mover 12 which in the present illustration comprises an electric motor to which power is supplied through a conventional cable 13 fitted with a conventional attachment plug 14. While for the sake of illustration the prime mover 12 is shown as an electric motor, it is to be understood that any suitable form of prime mover may be employed. Mounted on the platform 10 adjacent the prime mover 12 is a conventional speed reduction gear 15 which is coupled through any suitable type of coupling 16 to the drive shaft of the prime mover 12. Connected as at 18 to the power take-off side of the speed reduction gear 15 is a flexible shaft 19 of conventional form, which is equipped at the end opposite connection 18 with a coupling 20 to which the drive shaft of the agitator is connected as will be more fully hereinafter explained.

In order to confine the soil being treated to a limited area I employ a bell shaped hood 21 having a beaded rim 22 and formed at diametrically opposite points near the beaded rim with laterally extending bosses 23 carrying outwardly extending studs 24 provided adjacent their outer ends with transverse openings for the reception of cotter pins 25 the use of which will more fully hereinafter appear.

Formed at the apex of the bell shaped hood 21 is an axial opening 26 (Fig. 4) in which is seated a suitable bearing bushing 27. A vertically extending shaft 28 is rotatably fitted in said bushing and carries at its upper end a socket 29 having a rectangular axial recess 30 into which the end of the driving element of the flexible shaft 19 is detachably entered to effect driving connection between the prime mover 12 and the shaft 28. Attached to the lower end of the shaft 28 is a tool chuck which in the present embodiment takes the form of a socket 31 carrying a thumbscrew 32 by which the shank of one of my earth agitating tools is adapted to be clamped in the socket 31. It will be understood of course that any suitable chuck may be substituted for the simple socket and thumb screw disclosed.

Extending upwardly from the bell shaped hood 21 in concentric relation with the opening 26 is a collar 33, the upper end of which is externally screw-threaded to effect a connection with the coupling 20. Surrounding the collar 33 is a sleeve 34 carrying a pair of radial arms 35. Surrounding each stud 24 is a sleeve 36 and extending upwardly from each sleeve 36 is an inclined arm 37, the upper ends of which are bent inwardly toward each other as at 38, and are joined together to form a longitudinally disposed handle 39. The ends of the arms 35 opposite those joining the sleeve 34 are welded or otherwise secured to the arms 37 in order to effect a rigid connection between the handle 39 and the hood 21.

In Figure 4 I have disclosed one type of cultivator blade designated generally 40. This blade comprises a shank 41 adapted to enter the socket 31 and to be clamped therein by the thumbscrew 32. Riveted or otherwise secured to the shank 41 is an arched blade 42, opposite legs of which are bent in opposite directions and pointed as at 43 to effect a digging action in the earth about the axis of the shank, so as to loosen the soil about a growing plant.

In the modification illustrated in Figure 5, the agitator 44 embodies a shank 45 adapted to enter the socket 31 and to be clamped therein by the thumbscrew 32. Riveted or otherwise secured to the shank 45 is an arched blade 46, the ends of opposite legs of which are provided with teeth 47 forming in effect a rake by which the soil being treated may be broken up and pulverized about a growing plant.

In Figure 6 I have illustrated a further modification of agitator designated generally 48. In this type of agitator I employ a shank 49 for connection to the socket 31 as previously explained, and carried by the shank 49 is an auger blade 50 by which the earth may be drilled for planting. A pair of arched sweeps 51 are also carried by the shank 49 for rotation therewith, so that any earth thrown outwardly by the auger will be agitated and pulverized.

In the further modification illustrated in Figure 7 the agitator designated generally 52 comprises a shank 53 carrying at its lower end a disk 54 to which a plurality of arched agitator blades 55 are welded or otherwise secured. The lower earth contacting ends of these blades are twisted as at 56 so that as the agitator rotates about the axis of the shank 53, the earth will be thrown inwardly toward a growing plant which is under cultivation.

In use it will be understood that the operator selects an agitator suited to his purpose and introduces the shank thereof into the socket 31. Upon setting the prime mover 12 into operation, it will be evident that the agitator will be driven beneath the hood 21. The implement may then be moved to the desired position and as the agitator loosens and breaks up the earth, the loosened earth will be confined by the hood and prevented from being distributed over a wide area. As a result the cultivation of growing plants may progress without disturbing other plants in the immediate vicinity thereof and individual attention may be given to any one plant. It is to be noted that by supporting the agitator on the hood, the depth to which the cultivation takes place is limited and hence injury to the roots of the plants being cultivated is avoided.

While in the foregoing there has been shown and described the preferred embodiment of the invention, it is to be understood that minor changes in the details of construction, combination and arrangement of parts, may be resorted to without departing from the spirit and scope of the invention as claimed.

I claim:

1. In a hand garden tool, a rigid substantially bell shaped implement supporting hood, the rim of said hood resting on the earth and defining an area within which earth is to be worked, an arched earth working implement operably supported by and within the hood, said implement being mounted in the top of said hood to rotate about the vertical axis thereof in substantially concentric relation to a plant and being supported against vertical movement relative to said hood, means extending axially through the hood for rotating said implement, means outside of the hood and connected to the implement rotating means for driving said implement, and a handle connected to the hood by which the hood and the implement may be bodily lifted and transported.

2. In a hand garden tool, a rigid substantially bell shaped implement supporting hood, the rim of said hood resting on the earth and defining an area within which earth is to be worked, an arched earth working implement operably supported by and within the hood, said implement being mounted in the top of said hood to rotate about the vertical axis thereof in substantially concentric relation to a plant and being supported against vertical movement relative to said hood, means extending axially through the hood for rotating said implement, a prime mover outside of the hood, a flexible shaft connected to the prime mover and to the implement rotating means for driving said implement when the prime mover is set into motion; and a handle connected to the hood by which the hood and the implement may be bodily lifted and transported.

3. In a hand garden tool, a rigid substantially bell shaped implement supporting hood, the rim of said hood resting on the earth in encircling relation to a plant, said rim defining an area of the earth about the plant within which the earth is to be worked, an arched earth working implement supported by and operable within the hood, said implement being mounted in the top of the hood to rotate about the vertical axis of said hood in substantially concentric relation to the plant, means extending through the top of the hood and connected to the implement for rotating said implement, means outside of the hood and connected to the implement rotating means for driving said implement and a handle connected to the hood by which the hood and the implement may be bodily lifted and transported.

RUSSELL J. BARROW.

REFERENCES CITED

The following references are of record in the file of this patent:

UNITED STATES PATENTS

| Number | Name | Date |
| --- | --- | --- |
| 2,356,072 | Mahler | Aug. 15, 1944 |
| 2,361,798 | Smith | Oct. 31, 1944 |
| 2,394,771 | Hill | Feb. 12, 1946 |

FOREIGN PATENTS

| Number | Country | Date |
| --- | --- | --- |
| 513,357 | France | Feb. 14, 1921 |
| 194,113 | Switzerland | Feb. 1, 1938 |